June 3, 1941.    E. A. ROCKWELL    2,244,317
HYDRAULIC POWER SYSTEM
Filed Nov. 25, 1938    5 Sheets-Sheet 1

INVENTOR
Edward A. Rockwell
BY
Arthur Wright
ATTORNEY

June 3, 1941.  E. A. ROCKWELL  2,244,317
HYDRAULIC POWER SYSTEM
Filed Nov. 25, 1938  5 Sheets-Sheet 2
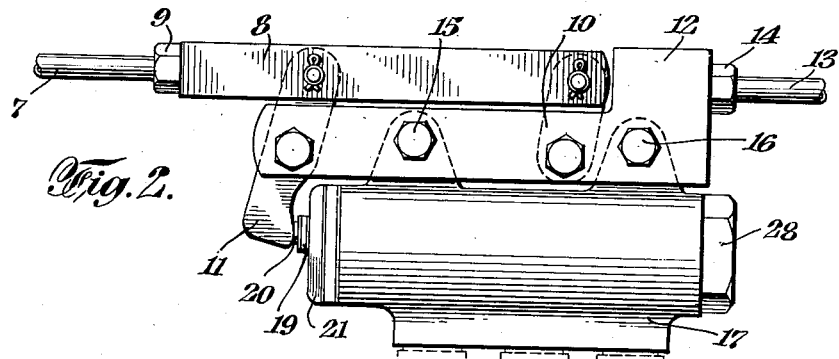
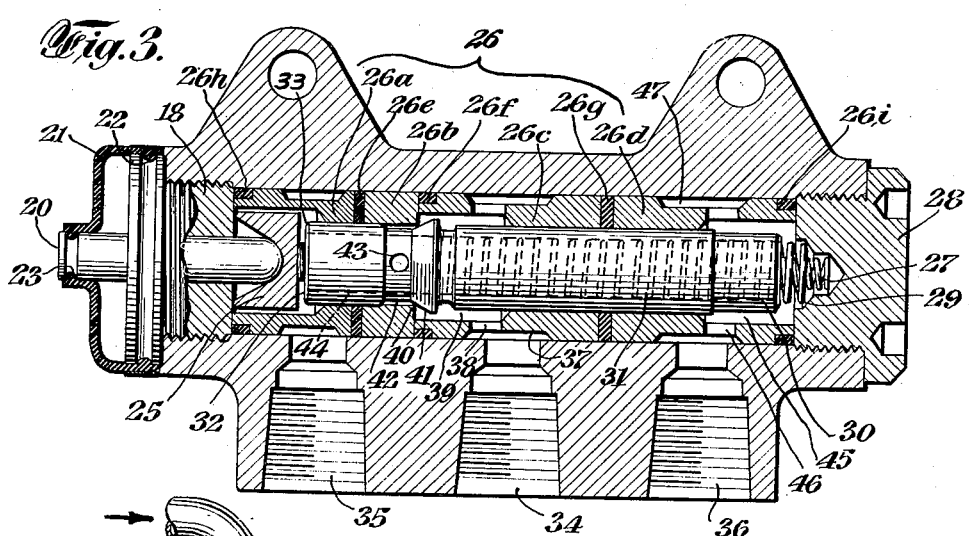
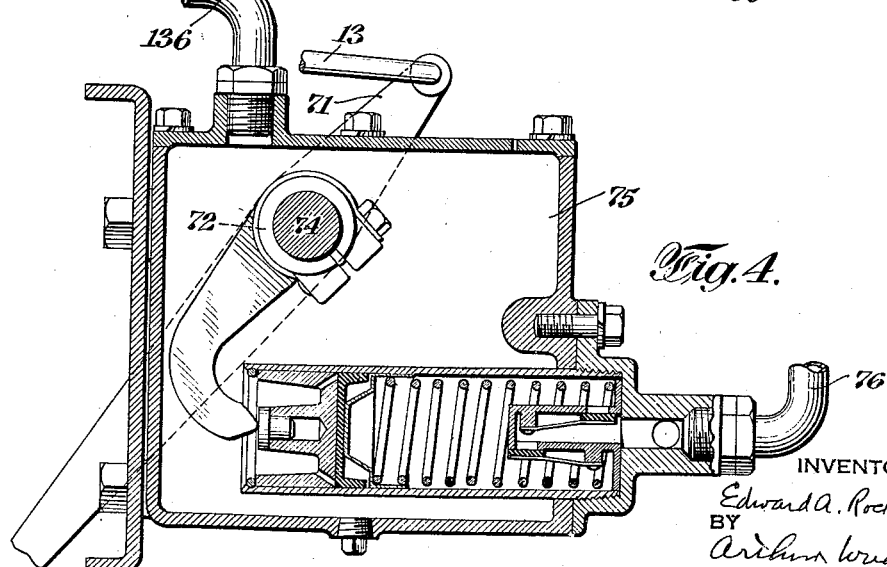
INVENTOR
Edward A. Rockwell
BY
Arthur Wright
ATTORNEY

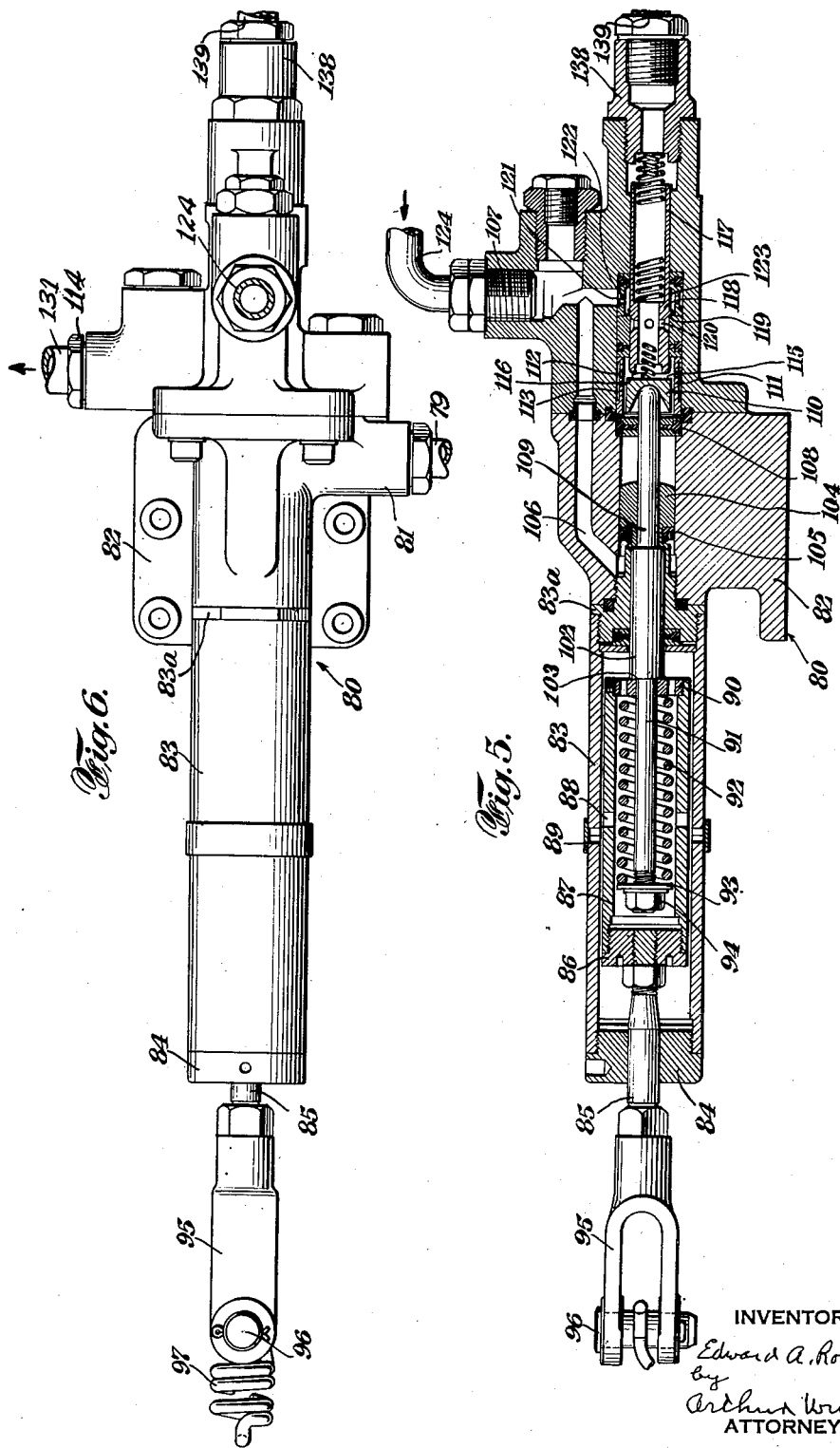

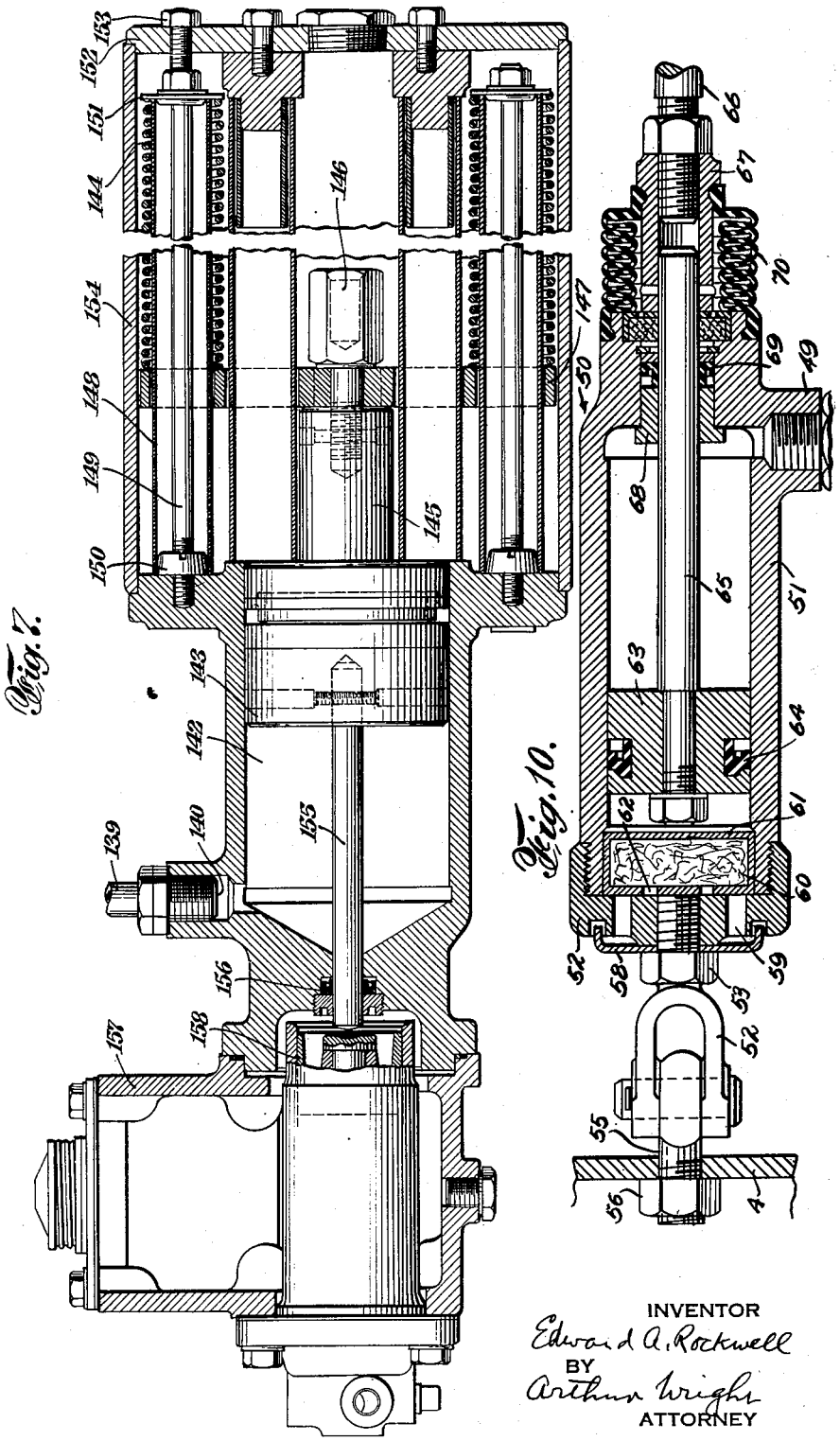

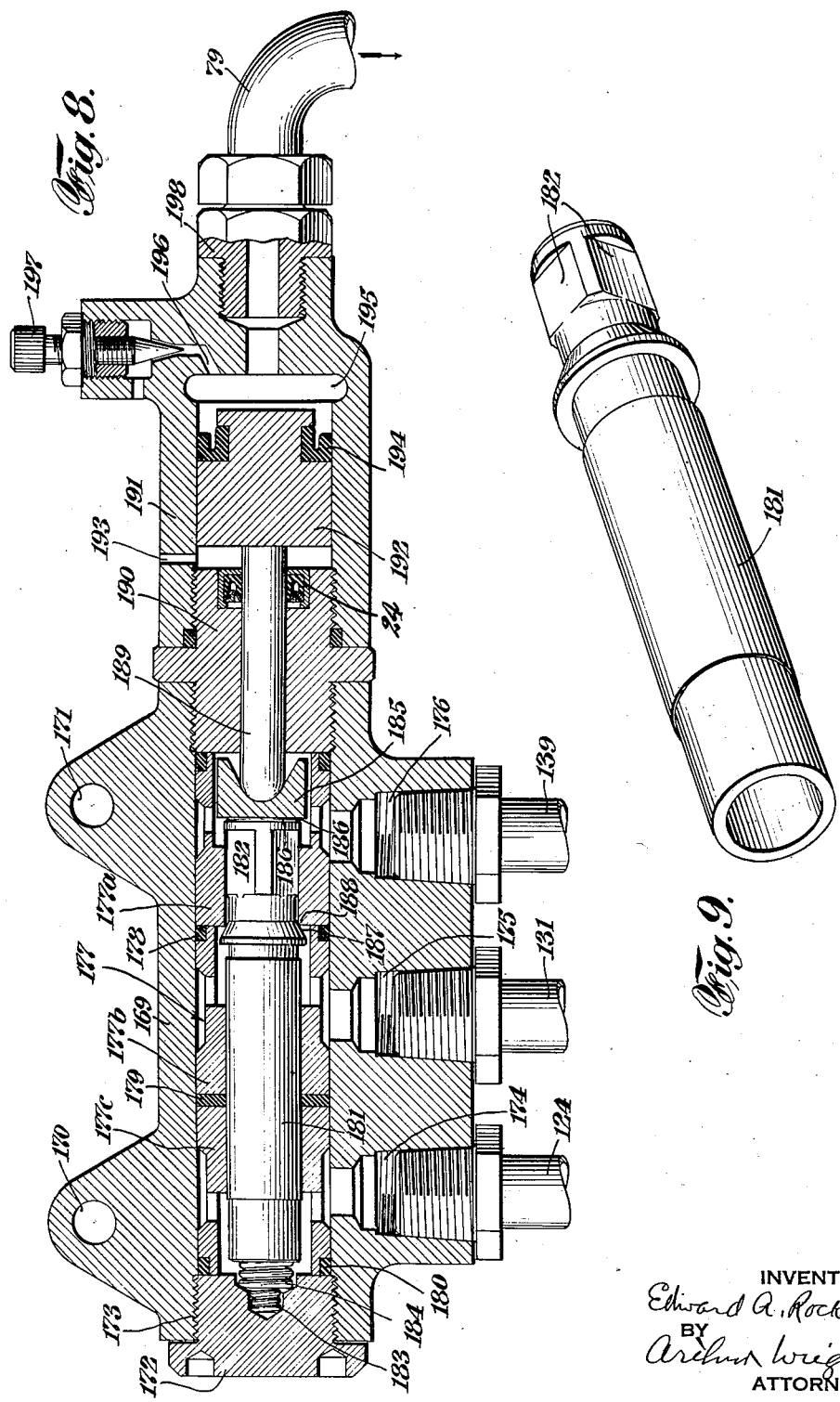

Patented June 3, 1941

2,244,317

UNITED STATES PATENT OFFICE 2,244,317

HYDRAULIC POWER SYSTEM

Edward A. Rockwell, Forest Hills, N. Y.

Application November 25, 1938, Serial No. 242,255

28 Claims. (Cl. 188—152)

My invention relates particularly to a system adapted to apply hydraulic power to the operation of apparatus of any desired character but which is especially applicable for the control of automobile accessories.

The object of my invention is to provide a hydraulic system acting as a relay or for applying reverse modulation in the control of apparatus wherever desired, but which is applicable especially for the control of automobile accessories. One of the objects of my invention is to provide a relay valve in connection therewith, and another object is to provide means whereby reverse modulation is obtained, that is to say a modulating pressure which is so arranged that the higher the hydraulic pressure applied a smaller degree of actuation of the accessory is obtained and vice versa. This is particularly adaptable, for example, in connection with means as set forth hereinafter, for providing a safety feature, as, for instance, on brakes in which the brakes are normally pressed into action in case of any failure of the hydraulic system, which latter is utilized for throwing the brakes out of action as the hydraulic pressure applied thereto increases. The latter provides an effective automatic safety feature in the hydraulic system, as applied to various automotive accessories.

While my invention is capable of embodiment in many different forms, by way of illustration I have shown only certain embodiments thereof in the accompanying drawings, in which—

Fig. 2 is a side elevation showing the main hydraulic actuating unit;

Fig. 3 is a vertical section through the same;

Fig. 4 is a longitudinal horizontal section through the booster used therein;

Fig. 5 is a longitudinal vertical section through the relay valve structure therein;

Fig. 6 is a plan view of the same;

Fig. 7 is a horizontal longitudinal section of the automatic pack device contained therein;

Fig. 8 is a longitudinal section of a modified form of the relay valve structure which can be used instead of the relay valve shown in Fig. 5;

Fig. 9 is a perspective view of the tubular valve therein; and

Fig. 10 is a cross-section of a hydraulic mechanical operating unit.

Figure 1:
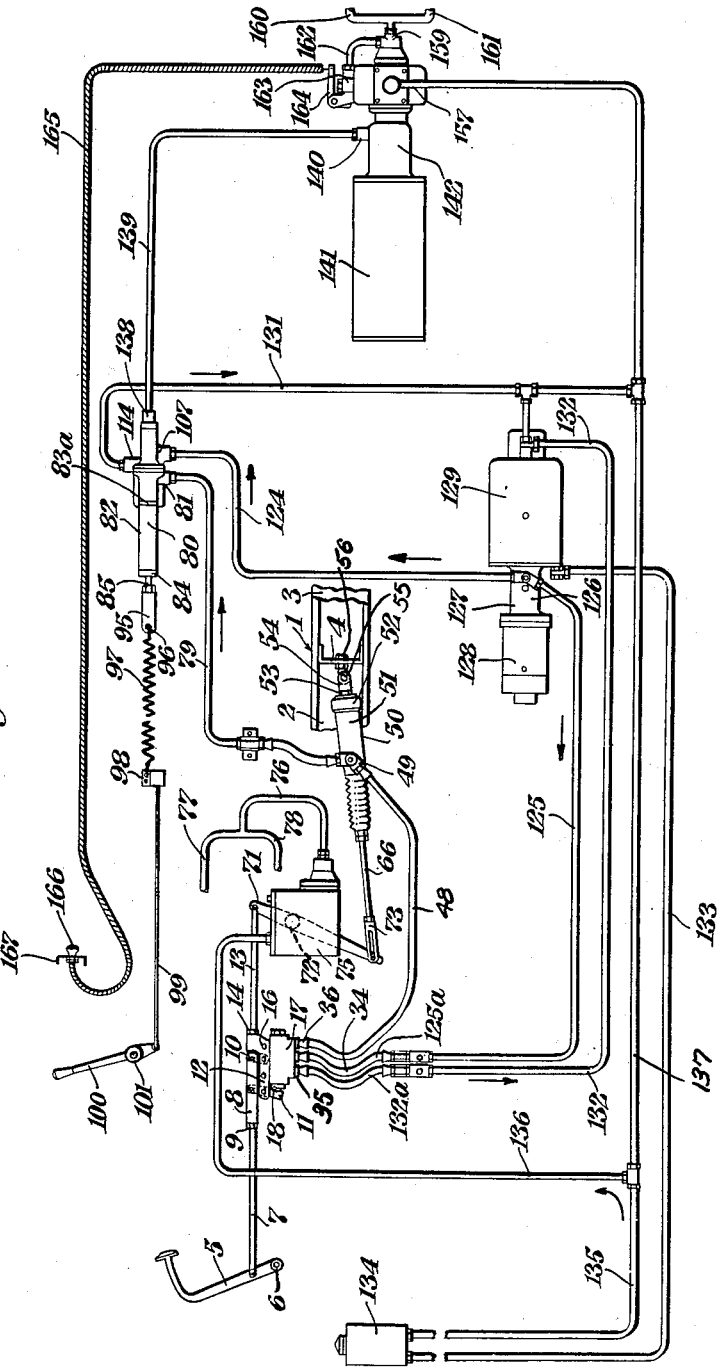
Fig. 1 is a diagrammatic elevation of a hydraulic system made in accordance with my invention.

In the form of my invention as shown in the accompanying drawings, I have illustrated a frame 1 of an automobile chassis, comprising two longitudinal U-beams 2 and 3 and a transverse U-beam 4. Mounted on the chassis of the automobile, at any desired point accessible to the driver, there is provided a foot-pedal lever 5 carried by a pivot 6 having a valve operating rod 7 pivotally connected to said lever and which, at the other end, is screw-threaded into a valve operating yoke 8, locking screws 9 being provided to secure the rod 7 and yoke 8 together, which is pivotally mounted on a rear link 10 and a front valve operating link and lever 11 which are pivotally carried in a bifurcated bracket 12 which in turn is screw-threaded at its rear end to a brake-operating-rod 13, a locking nut 14 being provided to tighten the bracket 12 on the brake-rod 13. The link 10 and lever 11 provide for longitudinal parallel movement of the yoke 8 when operated by the foot-pedal lever 5. The bracket 12 is, furthermore, secured by bolts 15 and 16 to a valve housing 17. At its forward end the valve housing 17 has screw-threaded into the same a cap 18 provided with a central opening 19 to receive a plunger 20 which abuts against the end of the lever 11. A rubberboot 21, to prevent the access of dirt, is received at one end in a recess 22 in the cap 18 and at the other end in a recess 23 in the plunger 20. An annular rubber seal 24, such as is shown in Fig. 8, U-shaped in cross section, is also carried in the cap 18 around the plunger 20 to prevent the leakage of low pressure hydraulic fluid from the valve structure. At its rear end the plunger 20 is received in a slidable head 25 carried within a four-piece cylindrical shell 26 having composite parts 26a, 26b, 26c, 26d, separated by rubber seals 26e, 26f, 26g, within the valve housing 17, the composite cylindrical shell 26 having, also, terminal rubber seals 26h, 26i. The slidable head 25 is normally urged in a forward direction by means of a spring 27 which abuts against the same, and after passing through the valve structure is seated within a rear cap 28 screw-threaded in the valve housing 17. Also seated in the rear cap 28 there is a larger and stronger spring 29 which, at its other end, abuts against a shoulder 30 on the interior of a tubular valve 31 located within the cylindrical shell 26, the said valve 31 having at its forward end a slightly flattened valve seat 32 adapted to contact, when closed, with the slidable head 25. The edge of this end of the tubular valve 31 is provided with a chambered portion 33 so that, as a result, the flattened valve seat will have a diameter which is somewhat less than the diameter of the rear portion of the tubular valve 31 to prevent the hydraulic pressure from pushing the slidable head 25 off said valve seat. However, this diameter of the flattened valve seat 32 is not made much smaller than the diameter of the rear end of the tubular valve 31, so as thus to avoid requiring the head 25, and therefore, the foot-pedal 5, to change the foot pressure too much in the decreasing or off modulation control.

The valve housing 17 has a high pressure inlet 34 for hydraulic liquid under any desired pressure, which may be, for example, 500 to 1000 lbs. per square inch, and is provided with a low pressure hydraulic liquid outlet 35 and a modulating pressure port 36 for modulated pressure to be supplied for operating the brake or other automobile accessory. The high pressure hydraulic liquid, after entering the port 34, is received in an annular passageway 37 in the exterior of the cylindrical shell 26c and which is connected by a port 38 to an internal annular passageway 39 which extends to the front end of the shell 26c so as to end in an annular valve seat 40 on the rear of the end of the shell 26b, the edge of the said valve seat 40 being slightly smaller in diameter than the diameter of the rear end of the tubular valve 31 so as to insure a positive closing of the tubular valve 31 against said valve seat. On the exterior of the tubular valve 31 there is a tapered valve surface 41 cooperating with said valve seat 40 to thus provide a valve which is normally closed to prevent the entry of the high pressure liquid. When, by the movement of the pedal lever 5, the sliding head 25 is moved to the rear to close the valve against the valve seat 32 and thereafter unseat the valve 41 from the seat 40, the high pressure fluid will then have access through an annular passageway 42 and ports 43 to a longitudinal passageway 44 in the interior of the tubular valve so that the high pressure liquid can then have access to the rear end of the tubular valve 31 and thence to an internal annular passageway 45, radial ports 46 and an external annular passageway 47 in the shell 26d to the modulating pressure port 36. The modulating pressure thus applied through the port 36 passes by means of a flexible rubber tube 48 to a port 49 in a previously known mechanical operating unit 50. This is of any desired construction but may, for example, be comprised of a cylinder 51 having a head 52 secured by a bolt 53 and yoke 54 to a pivot 55 mounted on the U-beam 4 of the chassis and to which it is secured by a bolt 56. On the bolt 53 there is a baffle 58 on the exterior of the head so as to provide access of air to the ports 59 in said head, which lead into the cylinder 51 having a horsehair packing 60 carried in an enclosure 61 having air openings 62, so as thus to permit the access of air to the cylinder while separating dust therefrom. In the cylinder 51 there is a piston 63 having a rubber seal 64, said piston 63 being connected by a piston rod 65 to a brake rod 66 by means of a screw-threaded connecting member 67. Around the piston rod 65 there are the usual bushing 68, rubber seal 69 and rubberboot 70, the ends of which are connected, respectively, to the cylinder 51 and the connecting member 67. This construction is also described in my copending application upon Apparatus for controlling the application of power, Ser. No. 241,312, filed November 19, 1938.

The brake-operating-rod 13 leads to the upper end of a lever 71 having a pivot 72 and the lower end is connected by a slotted member 73 to the rod 66. The pivot 72 is comprised of a shaft 74 on which the lever 71 is tightly secured, which extends into a Loughead master cylinder 75, which is an apparatus designed for converting mechanical movement into hydraulic pressure, the details of which form no part of the present invention, and which are utilized as disclosed in the Loughead et al. Patent No 1,707,063, granted March 26, 1929. The hydraulic pressure produced by the Loughead master cylinder 75 is conveyed by a pipe 76 to a pair of front wheel brakes through branch pipes 77 and 78 for the actuation of the front wheel brakes in the usual way. As will be noted, the booster 50 may add additional power to the manual power applied to the lever 71 by means of the rod 66.

The modulated pressure delivered by the pipe 48 is also arranged to be conveyed by a pipe 79 to a relay valve 80 through a port 81. The said relay valve 80 is comprised of a casing 82 to the forward end of which there is screw-threaded a shell 83, by means of a coupling member 83a, having a screw-threaded closure 84 arranged to receive a manual actuating rod 85 connected to a head 86 in a sliding sleeve 87 having a venting port 88 adapted to pass over a venting port 89 in the shell 83, these ports 88 and 89 being merely breather openings. The sliding sleeve 87 has at its rear end a vented closure 90 for receiving a valve actuating rod 91 around which there is a spring 92 held on the rod 91 by a retainer washer 93 and a nut 94. The said rod 85 is connected by a yoke 95 and a pin 96 to a spring 97 which in turn is connected by a clamping member 98 to an emergency brake operating rod 99 connected to a hand lever 100 having a pivot 101 at any desired point on the automobile chassis.

The rear end of the rod 91 has an enlargement 102 which cooperates with a transverse forward stop 103 in the sleeve 87 and provides an abutment for receiving at the rear thereof a valve-operating plunger 104 tightly mounted on a reduced portion 109 of the rod 91 having a rubber seal 105 at its forward end. The inlet for the modulated pressure 81 is in the chamber, which is in the rear of the plunger 104, so as to move the plunger 104 in opposition to the high pressure hydraulic liquid conveyed to the other side of the plunger 104 by a passageway 106 which communicates with a high pressure liquid inlet 107 on the valve casing 82. The rear end of the chamber formed by the plunger 104 is closed by a rubber-sealed partition 108 through which the reduced portion 109 at the rear end of the rod 91 passes so as to abut against a valve member 110 reciprocable within an annular member 111 having ports 112 communicating with an annular passageway 113 communicating with a low pressure or return inlet 114. The said valve member 110 has a flat face 115 which is adapted to seat against a valve seat 116 on a tubular valve member 117 which is constructed the same as the tubular valve member 31 previously described. This tubular valve member has a tapered valve element 118 which cooperates with a valve seat 119, the same as in the case of the valve 31 previously described. This valve, through transverse ports 120, gives access for the high pressure liquid to the interior of the tubular valve 117 from an annular passageway 121, ports 122, a passageway 123 and the high pressure liquid inlet 107. The high pressure liquid supplied to the port 107 is received from a pipe 124 and the said high pressure liquid is received by the inlet 34 from a pipe 125 havng a flexible rubber connection 125a, both of which pipes lead to a high pressure supply reservoir 126 supplied from a rotary pump 127 driven by an electric motor 128, pressure within the pressure chamber 127 being maintained substantially uniform by means of an accumulator 129 having a series of coil springs acting on a plunger at one end of the high pressure chamber 126. The details of the structure of the accumulator 129, reservoir 126, pump 127 and electric motor 128 do not constitute part of the invention of the present application but are shown in detail in my copending application upon Pressure accumulator apparatus, Ser No. 105,679, filed October 15, 1936, now Patent No. 2,197,772, April 23, 1940, as well as my application upon Electroflow power supply systems, Ser. No. 28,699, filed June 27, 1935, Patent No. 2,136,638, granted November 15, 1938. The low pressure of exhaust liquid discharged by the port 114 is conveyed by a pipe 131 to the low pressure side of the accumulator 129 and the same is true with regard to the low pressure liquid discharged from the port 35 which is conveyed by a pipe 132 having a flexible rubber connection 132a also to said low pressure side of the accumulator 129. The low pressure side of said accumulator is furthermore connected to a filler pipe 133 which leads to a filler reservoir 134 having a pipe 135 connected by a filler pipe 136 to the top of the Loughead master cylinder 75 and by a pipe 137 connected in turn to the low pressure pipe 131.

The high pressure liquid normally keeps the valve 115, 116 closed and the valve 118, 119 open so that the high pressure liquid passes around the valve 118, 119 through the ports 120 and thence through the interior of the tubular valve 117 and out through a coupling member 138 and a pipe 139 to a port 140 on an automatic pack device 141 provided as a safety feature and which automatically applies the brakes on the failure of the liquid pressure. This automatic pack 141 is comprised of a hydraulic pressure chamber 142 in which the pressure liquid operates on the forward face of a piston 143 and in opposition to a series of springs 144 which normally press the piston 143 forwardly to apply the brakes. The said piston 143 has a cylindrical reduced extension 145 which is connected by a screw 146 to a slidable spring-retaining plate 147 on which the springs 144 are supported at one end thereof. Guide tubes 148 pass through the springs 144 and through the plate 147, said tubes being held in place by rods 149 passing through said tubes and screw-threaded at one end in the casing of the chamber 142. At this end centering members 150 on said rods keep the tubes 148 in place and at the rear end centering plates 151 on said rods also act as abutments for the springs 144. The rods 149 at this end pass through a head 152 which, by means of nuts 153 on the rods 149, hold an enclosing shell 154 in place. On the forward face of the said piston 143 there is a piston rod 155 which extends through a packing 156 against a plunger contained in another Loughead master cylinder 157 and constructed the same as in the Loughead patent above referred to and as shown in the said Loughead patent, except that in this instance, instead of a lever actuation of the Loughead cylinder the end of the piston rod 155 abuts against a plunger 158 in the said Loughead cylinder, the same as the usual plunger contained in the master cylinder 75 above referred to and in the said Loughead patent. The hydraulic liquid for the control of the rear brakes passes out of the Loughead master cylinder 157 through a port 159 and thence by branch pipes 160 and 161 to the operating parts of the rear wheel brakes in the usual way. In case of emergency, should it be desired to release the brakes when they are on, due to the pressure received from the Loughead master cylinder to the pipe 159, there may be provided for such emergency a by-pass pipe 162 leading from the pipe 159 to the interior of the Loughead master cylinder 157, that is to say to a point outside of the plunger 158. This by-pass pipe 162 can be provided with an operating valve 163 adapted to be opened by a bell-crank lever 164 and a Bowden wire 165 leading to a manually operable pull-knob 166 on the dash 167 of the automobile.

In Figs. 8 and 9 I have shown a modified form of the relay valve structure which, however, operates in substantially the same manner as the relay valve structure shown in Fig. 5, although the valve parts in this instance are somewhat simpler in construction. In the form of my invention shown in Figs. 8 and 9 there is a relay valve housing 169 having holes 170 and 171 thereon for attachment of the housing to any desired part of the chassis of the automobile. At its forward end there is a screw-threaded cap 172 closing a longitudinal bore 173 within the housing in which the valve parts are carried. Said housing, furthermore, at this end, carries three ports 174, 175 and 176 which are provided for connection, respectively, to the pipes 124, 131 and 139. Within the bore 173 there is located a three-piece cylindrical shell 177 having component parts 177a, 177b and 177c provided with gaskets 178, 179 and 180, the construction of these parts of the shell and gaskets being the same as in the form of my invention shown in Fig. 3, except in this instance the parts 26a and 26b are combined to form the part of the shell 177a. Within the composite shell 177 there is a tubular valve 181 which is constructed the same as the tubular valve 31 previously described except that in this instance the holes 43 are omitted and four flat areas 182 are located near the end of the valve shown at the right of the tubular valve in Fig. 8. Also, in this instance, within the tubular valve 181 there is a spring 183 of small diameter and a large spring 184 which springs are arranged and operate like the springs 27 and 24 previously described. The smaller spring 183 normally keeps open a flat valve member 185 cooperating with the adjacent end of the tubular valve 181 to keep the valve member 185 normally away from its seat 186 on this end of the tubular valve, constructed the same as the valve seat 32 previously described. Intermediate its ends the tubular valve 181 has an annular tapered valve member 187 constructed the same as the valve member 41 previously described and which cooperates with a valve seat 188 arranged the same as the valve seat 40 previously described. The forward end of the tubular valve 181 leads to the high pressure port 174, the intermediate valve 187, 188 controls communication with the low pressure port 175, and the valve 185, 186 controls communication between the interior of the tubular valve 181 and the modulated pressure port 176. The position of the valve element 185 is controlled by a plunger 189 passing through an end closure 190 screw-threaded in the housing 169, the said closure 190 acting as a coupling for connecting the housing 168 with a cylinder 191 to which it is screw-threaded, said cylinder having a piston 192 therein to which the plunger 189 is connected. A vent 193 is provided in the cylinder 191 at the forward end of the piston 192. At the rear end of the piston 192 there is a U-shaped rubber sealing member 194 to seal a chamber 195, which has a bleeder opening 196 closed by a screw-plug 197 which can be removed when desired to permit the escape of accumulated air from the chamber 195. The said chamber 195 is connected by a screw coupling 198 to the pipe 79.

In the operation of the apparatus, referring first to the embodiment of my invention shown in Figs. 1 to 7, the system having been supplied with the required hydraulic brake fluid through the filler tank 134, the apparatus is ready for the operation of the brakes in the control of the automobile. It will be noted that the hydraulic brake fluid, which is of any desired character, is supplied by the filler tank 134 to the Loughead booster 75 as well as the Loughead brake-operating-element 157 which is connected to the automatic pack 141 and also the low pressure reservoir accumulator 129, and the said tank 134 receives the returned low pressure liquid through the pipe 131 from the control or relay valve 80 as well as from the low pressure outlet 35 on the main modulating valve. When the brakes are to be operated, the pedal-lever 5 is moved downwardly to the extent desired and thereby the desired amounts of a modulated high pressure liquid are allowed to pass by the valve 40, 41 and thus applied by the pipe 48 to operate the brakes, and which is coordinated in extent to the amount or the degree of the pressures exerted manually on the pedal-lever 5. When this takes place the liquid received by the accumulator 129 placed under high pressure by the pump 127, is delivered by the pipe 125 therefrom and the outlet valve 25, 32 having been closed and the high pressure inlet valve 40, 41 having been opened manually, the said liquid passes from the port 34 through openings 38, openings 40 and passageway 44 to the chamber 45 where the pressure on the end of the tubular valve 31 will close the valve 40, 41 unless further liquid is being admitted. In this way, although power derived from the high pressures is applied to the brakes, the amount of the same is determined by the feel which reacts on the foot through the pedal lever 5. It will be noted, furthermore, that by applying the manual pressure to the pedal-lever 5 the front brakes are applied manually in any event due to the mounting of the valve casing 17 on the brake-rod 13 and which applies hydraulic pressure from the Loughead master cylinder 75 to the front brakes 77. This effect is, however, boosted by reason of the modulated pressure delivered through the pipe 48 to the hydraulic booster 50 and thence to the lever 71 on the Loughead master cylinder 75. This modulated pressure derived from the pipe 48 is furthermore conveyed by the pipe 39 to the control or relay valve 80. The latter is, in one form of actuation, connected to the emergency brake hand-lever 100 in that thereby a pull on the rod 91 through the interposed spring 92 will result in the piston 104 moving to the left to open the valve 115, 116 which is normally shut, due to the relatively large size of the piston 104, by the high pressure liquid from the passageway 106 moving the piston 104 to the right and which valve 115, 116 communicates with the low pressure outlet 114 so as to close the normally-open high pressure inlet valve 118, 119, thus permitting to the extent desired the modulated escape of the high pressure liquid through the low pressure outlet 114, from the pipe 139 leading from the automatic pack 141. Instead of such manual actuation from the emergency brake lever 100, however, the modulated high pressure supplied through the pipes 79 and 48 from the modulating valve 40, 41 and supply of liquid to the chamber 45 can similarly act on the right face of the piston 104 to bring about the modulated pressure control and operation of the said automatic pack 141 and the rear brakes 160 connected thereto. In this operation, the change by increments or decrements of the pressures established hydraulically on the right face of the piston 104 controls the opening of the outlet valve 115, 116 and closing of the inlet valve 118, 119. When the valve 118, 119 is closed and the valve 115, 116 opened the liquid passes out from the pipe 139 through the valve 115, 116 to the pipe 131 and back to the accumulator. When the brakes are being applied at a given degree both of the valves 115, 116 and 118, 119 are closed as the decrease of the pressure in the pipe 139 permitted by the particular pressure on the right face of the piston 104 will continue until the lessened pressure on the face of the valve member 118 causes the pressure on the left face of the piston 104 to move the valve member 118 into closed position. In other words, the tubular valve member 117 operates similarly to the valve member 31 but in the reverse order. It will be noted, however, that either of these types of actuation of the control or relay valve 80 results in a reverse modulation, that is to say in pressure conditions within the pipe 139, which are inversely proportioned or related to the modulated pressure in the pipe 79. In other words, as the pressure admitted through the pipe 79 increases, the pressure within the pipe 139 decreases and the pressure in the pipes 160, 161 increases. This enables a safety control or operation of the rear brakes to be attained by reason of the fact that the springs 144 normally press the rear brakes into action through the agency of the Loughead master cylinder 157 which conveys the resultant hydraulic pressure thereto through the pipe 159 and, when there is no manual actuation from the emergency lever 100 nor from the application of modulated high pressure through the pipe 79, the high pressure liquid which is supplied from the pipe 124 normally acts on the front end of the piston 104 to keep the valve 115, 116 closed and the valve 118, 119 open, admitting the maximum high pressure through the pipe 39 to the interior of the cylinder 142 so as to force the springs 144 in a direction keeping the rear brakes in off-position. The rear brakes are thus applied to the extent desired by releasing the high pressure in the pipe 139 to the extent desired from the pipe 139 so that the released liquid passes out through the low pressure outlet pipe 131 back into the filler system. In other words, if there is a breakage or failure of the hydraulic system the rear brakes are automatically thrown into action so as to apply the brakes. If this should occur the rear brakes can be thrown off manually, if desired, by the actuation of the bell-crank lever 164 from the handle 165 on the dash, the effect of which is to release the hydraulic brake fluid from the pipe 159 so as to allow it to enter the reservoir which forms a part of the Loughead master cylinder 157.

The modification of my invention shown in

Figs. 8 and 9 is a modification of the control or relay valve 80. The operation of this modified form of control or relay valve is substantially the same as in the operation of the control or relay valve 80 except that in this instance, for simplicity, there is shown no emergency brake manual control connected thereto. A further difference in this instance is that the valve 185, 186 is normally open while the valve 187, 188 is normally closed. Consequently, in this instance the high pressure brake fluid which normally keeps the rear brakes 160, 161 in off-position is received through the pipe 139 leading to the automatic pack from the high pressure pipe 124 and the interior of the valve 181. Upon actuation of the valve 181 by the modulated high pressure liquid received from the pipe 79 the valve 185, 186 is closed and the valve 187, 188 is opened so that the amount of the high pressure brake fluid desired to be released is carried away through the low pressure exhaust pipe 131.

It will be understood that in all of these modulator valve constructions 17, 80 and 169 the modulating effect described in the previously described operation herein takes place, except that in the valves 80 and 169 there is an inverse modulating effect obtained. These actions of the three valves so as to obtain a modulated effect by the admission or release of small increments of the brake fluid to the extent desired, in order to obtain the desired degree of high pressure in the on-modulation, can take place likewise and with the same effectiveness in the off-modulation and in an entirely comparable and similar manner. In this way, in the on-modulation the increasing increments of modulating fluid obtain increasing brake pressures in accordance with the amount of manual pressure applied but at very much higher pressures than the manual pressure itself, and in the off-modulation by decreasing pressures applied as desired manually, corresponding but very much higher decreasing pressures are obtained on the brakes at will until they are finally entirely released. At all times, however, the reaction on the foot, through the lever 11 and pedal 5, of the amount of high pressure liquid manually admitted produces from the chamber 45 on the head 25 a feel, that is to say an amount of reaction pressure coordinate to the extent to which the brakes are being applied. This amount of high pressure liquid applied to actuate the brakes can be changed manually by increments in the on or off modulation, as desired, to change the braking effect, but while the brakes are on after each admission or discharge of an amount of the high pressure liquid, the valves 25, 32 and 40, 41 remain closed until a further change in the amount of high pressure liquid present is made manually by the pedal 5.

While I have described my invention above in detail I wish it to be understood that many changes may be made therein without departing from the spirit of the same.

I claim:

1. In an apparatus of the character described, a work-performing element, means for applying a varying degree of fluid pressure, said means being reactive to the pressures applied thereby, and a valve apparatus constructed to receive the same and deliver therefrom to the work-performing element a fluid pressure which decreases coordinately as the fluid pressure received increases.

2. In an apparatus of the character described, means for applying a varying degree of fluid pressure, and a valve apparatus constructed to receive the same and deliver therefrom a fluid pressure which decreases as the fluid pressure received increases, said valve apparatus comprising a tubular valve having an end valve seat, a movable valve element contacting with said end valve seat, a tapered valve element on the tubular valve, and a valve seat cooperating with the tapered valve element.

3. In an apparatus of the character described, means for applying a varying degree of fluid pressure, a valve apparatus constructed to receive the same and deliver therefrom a fluid pressure which decreases as the fluid pressure received increases, and an automotive accessory connected to the delivery outlet of the valve apparatus for the actuation of said accessory, said valve apparatus comprising a tubular valve having an end valve seat, a movable valve element contacting with said end valve seat, a tapered valve element on the tubular valve, and a valve seat cooperating with the tapered valve element.

4. In an apparatus of the character described, means for applying a varying degree of fluid pressure, and a valve apparatus constructed to receive the same and deliver therefrom a fluid pressure which decreases as the fluid pressure received increases, said valve apparatus comprising a tubular valve constructed to receive the delivery fluid pressure at one end and having an end valve seat at the other end, a movable valve element contacting with said end valve seat, a tapered valve element on the tubular valve, and a valve seat cooperating with the tapered valve element, said tapered valve and seat being constructed to control the delivery from the valve structure.

5. In an apparatus of the character described, means for applying a varying degree of fluid pressure, a valve apparatus constructed to receive the same and deliver therefrom a fluid pressure which decreases as the fluid pressure received increases, and an automotive accessory connected to the delivery outlet of the valve apparatus for the actuation of said accessory, said valve apparatus comprising a tubular valve constructed to receive the delivery fluid pressure at one end and having an end valve seat at the other end, a movable valve element contacting with said end valve seat, a tapered valve element on the tubular valve, and a valve seat cooperating with the tapered valve element, said tapered valve and seat being constructed to control the delivery from the valve structure.

6. In an apparatus of the character described, means for applying a varying degree of fluid pressure, and a valve apparatus constructed to receive the same and deliver therefrom a fluid pressure which decreases as the fluid pressure received increases, said valve apparatus comprising a tubular valve constructed to receive the delivery fluid pressure at one end and having an end valve seat at the other end, a movable valve element contacting with said end valve seat, a tapered valve element on the tubular valve, and a valve seat cooperating with the tapered valve element, said end valve and movable valve element being constructed to control the delivery from the valve structure.

7. In an apparatus of the character described, means for applying a varying degree of fluid pressure, a valve apparatus constructed to receive the same and deliver therefrom a fluid pressure which decreases as the fluid pressure received increases, and an automotive accessory connected to the delivery outlet of the valve apparatus for the actuation of said accessory, said valve apparatus comprising a tubular valve constructed to receive the delivery fluid pressure at one end and having an end valve seat at the other end, a movable valve element contacting with said end valve seat, a tapered valve element on the tubular valve, and a valve seat cooperating with the tapered valve element, said end valve and movable valve element being constructed to control the delivery from the valve structure.

8. In an apparatus of the character described, means for applying a varying degree of fluid pressure, a valve apparatus adapted to receive the same and deliver therefrom a fluid pressure which decreases as the fluid pressure received increases, an automotive accessory connected to the delivery outlet of the valve apparatus for the actuation of said accessory, and a spring-operating means adapted to press the accessory into action, having a connection to said delivery for moving said spring so as to throw the accessory out of action.

9. In an apparatus of the character described, means for applying a varying degree of fluid pressure, a valve apparatus adapted to receive the same and deliver therefrom a fluid pressure which decreases as the fluid pressure received increases, an automotive accessory connected to the delivery outlet of the valve apparatus for the actuation of said accessory, said valve apparatus comprising a tubular valve having an end valve seat, a movable valve element contacting with said end valve seat, a tapered valve element on the tubular valve and a valve seat cooperating with the tapered valve element, and a spring-operating means adapted to press the accessory into action, having a connection to said delivery for moving said spring so as to throw the accessory out of action.

10. In an apparatus of the character described, means for applying a varying degree of fluid pressure, a valve apparatus adapted to receive the same and deliver therefrom a fluid pressure which decreases as the fluid pressure received increases, an automotive accessory connected to the delivery outlet of the valve apparatus for the actuation of said accessory, said valve apparatus comprising a tubular valve having an end valve seat, a movable valve element contacting with said end valve seat, a tapered valve element on the tubular valve and a valve seat cooperating with the tapered valve element, said tapered valve and seat being adapted to control the delivery from the valve structure, and a spring-operating means adapted to press the accessory into action, having a connection to said delivery for moving said spring so as to throw the accessory out of action.

11. In an apparatus of the character described, means for applying a varying degree of fluid pressure, a valve apparatus adapted to receive the same and deliver therefrom a fluid pressure which decreases as the fluid pressure received increases, an automotive accessory connected to the delivery outlet of the valve apparatus for the actuation of said accessory, said valve apparatus comprising a tubular valve having an end valve seat, a movable valve element contacting with said end valve seat, a tapered valve element on the tubular valve and a valve seat cooperating with the tapered valve element, said end valve and movable valve element being adapted to control the delivery from the valve structure, and a spring-operating means adapted to press the accessory into action, having a connection to said delivery for moving said spring so as to throw the accessory out of action.

12. In an apparatus of the character described, means for applying a varying degree of fluid pressure, said means being reactive to the pressures applied thereby and a valve apparatus constructed to receive the same and deliver therefrom a fluid pressure which decreases as the fluid pressure received increases, said valve apparatus comprising a valve controlling the said delivery and a movable means constructed to normally keep said delivery valve open but constructed to close said valve under the influence of the fluid received.

13. In an apparatus of the character described, means for applying a varying degree of fluid pressure, said means being reactive to the pressures applied thereby and a valve apparatus constructed to receive the same and deliver therefrom a fluid pressure which decreases as the fluid pressure received increases, said valve apparatus comprising a valve controlling the said delivery, a movable means constructed to normally keep said delivery valve open but constructed to close said valve under the influence of the fluid received, and an exhaust valve constructed to be brought into communication with said delivery under the influence of the fluid received.

14. In an apparatus of the character described, means for applying a varying degree of fluid pressure, and a valve apparatus constructed to receive the same and deliver therefrom a fluid pressure which decreases as the fluid pressure received increases, said valve apparatus comprising a valve controlling the said delivery, a movable means constructed to normally keep said delivery valve open but constructed to close said valve under the influence of the fluid received, and a manually operable device constructed to operate said movable means.

15. In an apparatus of the character described, means for applying a varying degree of fluid pressure, and a valve apparatus constructed to receive the same and deliver therefrom a fluid pressure which decreases as the fluid pressure received increases, said valve apparatus comprising a valve controlling the said delivery, a movable means constructed to normally keep said delivery valve open but constructed to close said valve under the influence of the fluid received, an exhaust valve adapted to be brought into communication with said delivery under the influence of the fluid received, and a manually operable device constructed to operate said movable means.

16. In an apparatus of the character described, means for applying a varying degree of fluid pressure, said means being reactive to the pressures applied thereby and a valve apparatus constructed to receive the same and deliver therefrom a fluid pressure which decreases as the fluid pressure received increases, said valve apparatus comprising a valve controlling the said delivery, and a plunger constructed to normally keep said delivery valve open but constructed to close said valve under the influence of the fluid received.

17. In an apparatus of the character described, means for applying a varying degree of fluid pressure, said means being reactive to the pressures applied thereby and a valve apparatus constructed to receive the same and deliver therefrom a fluid pressure which decreases as the fluid pressure received increases, said valve apparatus comprising a valve controlling the said delivery, a plunger constructed to normally keep said delivery valve open but constructed to close said valve upon the influence of the fluid received, and an exhaust valve adapted to be brought into communication with said delivery under the influence of the fluid received.

18. In an apparatus of the character described, means for applying a varying degree of fluid pressure, said means being reactive to the pressures applied thereby and a valve apparatus constructed to receive the same and deliver therefrom a fluid pressure which decreases as the fluid pressure received increases, said valve apparatus comprising a valve controlling the said delivery, and a plunger constructed to normally keep said delivery valve open but constructed to close said valve under the influence of the fluid received, one face of said plunger being located so as to receive the force of the incoming fluid and the other face of said plunger being in communication with a source of high pressure fluid, the admission of which to said delivery is controlled by the delivery valve.

19. In an apparatus of the character described, means for applying a varying degree of fluid pressure, said means being reactive to the pressures applied thereby and a valve apparatus constructed to receive the same and deliver therefrom a fluid pressure which decreases as the fluid pressure received increases, said valve apparatus comprising a valve controlling the said delivery, a plunger constructed to normally keep said delivery valve open but constructed to close said valve upon the influence of the fluid received, and an exhaust valve adapted to be brought into communication with said delivery under the influence of the fluid received, one face of said plunger being located so as to receive the force of the incoming fluid and the other face of said plunger being in communication with a source of high pressure fluid, the admission of which to said delivery is controlled by the delivery valve.

20. In an apparatus of the character described, means for applying a varying degree of fluid pressure, and a valve apparatus adapted to receive the same and deliver therefrom a fluid pressure which decreases as the fluid pressure received increases, said valve structure comprising a tubular reciprocable valve having thereon a delivery control valve member, a source of high pressure fluid, access of which to said delivery is controlled by said delivery valve, a discharge valve member adapted to cooperate with the tubular valve to act as a discharge for the delivered fluid when the delivery valve is closed, and means to alternately seat and unseat the said two valves under the influence of the pressure fluid received.

21. In an apparatus of the character described, means for applying a varying degree of fluid pressure, and a valve apparatus adapted to receive the same and deliver therefrom a fluid pressure which decreases as the fluid pressure received increases, said valve structure comprising a tubular reciproable valve having thereon a delivery control valve member, a source of high pressure fluid, access of which to said delivery is controlled by said delivery valve, a discharge valve member adapted to cooperate with the tubular valve to act as a discharge for the delivered fluid when the delivery valve is closed, and means to alternately seat and unseat the said two valves under the influence of the pressure fluid received, said tubular valve having a lateral port for conveying the high pressure fluid to the interior of the valve.

22. In an apparatus of the character described, means for applying a varying degree of fluid pressure, and a valve apparatus adapted to receive the same and deliver therefrom a fluid pressure which decreases as the fluid pressure received increases, said valve structure comprising a tubular reciprocable valve having thereon a delivery control valve member, a source of high pressure fluid, access of which to said delivery is controlled by said delivery valve, a discharge valve member adapted to cooperate with the tubular valve to act as a discharge for the delivered fluid when the delivery valve is closed, and means to alternately seat and unseat the said two valves under the influence of the pressure fluid received, said tubular valve having a flattened lateral area for establishing communication between the delivery and the discharge valves.

23. In a hydraulic power system, an automotive accessory, a manual actuator therefor, a modulating valve connected to said manual actuator for supplying modulated high pressure, a control valve adapted to receive the modulated pressure, a source of high pressure fluid connected to the modulating valve and the control valve, an actuating means for actuating the accessory, a high pressure connection from said control valve for controlling the accessory, a reservoir for supplying the source of high pressure fluid and low pressure connections from said modulating valve and said control valve to said reservoir.

24. In a hydraulic power system, an automotive accessory, a manual actuator therefor, a modulating valve connected to said manual actuator for supplying modulated high pressure, a control valve adapted to receive the modulated pressure, a source of high pressure fluid connected to the modulating valve and the control valve, an actuating means for actuating the accessory, a high pressure connection from said control valve for controlling the accessory, a reservoir for supplying the source of high pressure fluid, low pressure connections from said modulating valve and said control valve to said reservoir, and a filler tank connected to said low pressure connections.

25. In a hydraulic power system, an automotive accessory, a manual actuator therefor, a modulating valve connected to said manual actuator for supplying modulated high pressure, a control valve adapted to receive the modulated pressure, a source of high pressure fluid connected to the modulating valve and the control valve, a spring actuating means for actuating the accessory, a high pressure connection from said control valve for throwing the accessory out of action by the movement of said spring, hydraulic means connecting said spring with said accessory, a reservoir for supplying the source of high pressure fluid, low pressure connections from said modulating valve and said control valve to said reservoir, and a filler tank connected to said low pressure connections and said hydraulic means.

26. In an apparatus of the character described, means for applying a varying degree of fluid pressure, a valve apparatus adapted to receive the same and deliver therefrom a fluid pressure which decreases as the fluid pressure received increases, an automotive accessory connected to the delivery outlet of the valve apparatus for the actuation of said accessory, and a resilient means adapted to press the accessory into action, having a connection to said delivery for moving said resilient means so as to throw the accessory out of action.

27. In an apparatus of the character described, adapted to accumulate a fluid pressure differing from the atmospheric pressure, a work-performing element, means for applying a varying degree of hydraulic pressure, said means being reactive to the pressures applied thereby, and a valve apparatus constructed to receive the same and apply to the work-performing element accumulated fluid pressure which relaxes as the hydraulic pressure received increases.

28. In an apparatus of the character described, adapted to accumulate a fluid pressure differing from the atmospheric pressure, a work-performing element, manual means including a hydraulically operated plunger for applying from the plunger a varying degree of hydraulic pressure, said means being reactive to the pressures applied thereby, and a valve apparatus constructed to receive the same and apply to the work-performing element the accumulated fluid pressure which relaxes as the manually applied hydraulic pressure received increases.

EDWARD A. ROCKWELL.